United States Patent

Washimi

[11] Patent Number: 5,150,435
[45] Date of Patent: Sep. 22, 1992

[54] SIGNAL PROCESSING SYSTEM OF OPTICAL FIBER GYRO

[75] Inventor: Kouichi Washimi, Osaka, Japan

[73] Assignee: Sumitomo Electric Industries, Ltd., Osaka, Japan

[21] Appl. No.: 744,249

[22] Filed: Aug. 13, 1991

[30] Foreign Application Priority Data

Aug. 27, 1990 [JP] Japan .................. 2-225613

[51] Int. Cl.$^5$ .............................. G02B 6/26
[52] U.S. Cl. .......................... 385/1; 385/12; 356/350
[58] Field of Search ............ 356/350; 250/227; 350/96.11, 96.15; 385/12, 13, 14, 1

[56] References Cited

U.S. PATENT DOCUMENTS

| 4,299,490 | 7/1981 | Cahill et al. |  |
|---|---|---|---|
| 4,786,173 | 11/1988 | Fournier et al. | 356/350 |
| 4,842,358 | 6/1989 | Hall | 350/96.29 X |
| 4,863,273 | 9/1989 | Nishiura | 356/350 |
| 4,883,358 | 5/1989 | Okada |  |

FOREIGN PATENT DOCUMENTS

| 0172356 | 2/1986 | European Pat. Off. |
|---|---|---|
| 0185385 | 11/1986 | European Pat. Off. |

OTHER PUBLICATIONS

Patent Abstracts of Japan, vol. 10, No. 300 (P-506)[2356], 14th Oct. 1986.

*Primary Examiner*—John D. Lee
*Assistant Examiner*—Stephen W. Barns
*Attorney, Agent, or Firm*—Lane, Aitken & McCann

[57] ABSTRACT

A signal processing system of an optical fiber gyro comprises a light emitting element for generating a monochromatic light, a fiber coil, a branching element for dividing the monochromatic light into clockwise and counterclockwise lights, for transmitting the clockwise and counterclockwise lights to opposite ends of the fiber coil, respectively, and for uniting again the clockwise and counterclockwise lights into a coherent light, a light receiving element for detecting an intensity of the coherent light, and an auxiliary light receiving element for monitoring an output of the light emitting element. When the light emitting element output is less than a predetermined value, a power for driving the light emitting element is controlled so that a direct current component or even times higher harmonics component of a sensor signal obtained from the light receiving element becomes constant. When, on the other hand, the light emitting element output has reached the predetermined value, the light emitting element output is controlled by a monitoring signal of the auxiliary light receiving element so that it does not exceed the predetermined value.

2 Claims, 2 Drawing Sheets

SIGNAL PROCESSING SYSTEM OF OPTICAL FIBER GYRO

FIELD OF THE INVENTION

The present invention relates in general to an optical fiber gyro for detecting a rotational angular speed of vehicles, marine vessels, aircraft, etc., and more particularly to an improvement in the control of the light output of the light emitting element in the optical fiber gyro.

DESCRIPTION OF THE PRIOR ART

When lights pass through a coil formed by spirally winging an optical fiber many times, in clockwise and counterclockwise directions, respectively, there will occur a phase difference between the clockwise and anticlockwise lights if the coil is rotated. An optical fiber gyro is one which detects a rotational angular speed with the aid of the phase difference between the clockwise and anticlockwise lights.

For this purpose, the optical fiber gyro includes a light emitting element for generating a monochromatic light, and a fiber coil formed by spirally winding a single mode optical fiber many times. The optical fiber gyro also includes a branching element, which divides the light emitted by the light emitting element and transmits the divided lights to the opposite ends of the fiber coil and then unites the lights, which have passed through the fiber coil in the clockwise and counterclockwise directions of the coil, into a coherent light, and a light receiving element for detecting the coherent light output. A phase difference $\delta\theta$ between the clockwise and counterclockwise lights proportional to a rotational angular speed $\Omega c$ of the fiber coil is obtained by the optical fiber gyro.

Since in the optical fiber gyro of the above type the coherent light output is in the form of $\cos(\delta\theta)$, it is difficult to obtain the phase difference $\delta\theta$ accurately and therefore phase modulation, frequency modulation, etc. are employed.

For example, in the optical fiber gyro of the phase modulation type, the optical fiber adjacent at one end of the fiber coil is wound around a piezoelectric vibrator, and modulation voltage is applied between the electrodes of the piezoelectric vibrator. The piezoelectric vibrator is then expanded and contracted in its radial direction, so the optical fiber is also expanded and contracted. As a result, the phase of the light passing through the optical fiber is modulated.

Since the light receiving element output contains modulation frequency Q and higher harmonics components, if carrier signals of respective frequencies are made and the light receiving element output is synchronism-detected, its fundamental wave component and higher harmonics components can be obtained. If the amplitudes of the counterclockwise and clockwise lights are E1 and E2, the direct current component D of the light receiving element output can be written as:

$$D = (E1^2 + E2^2)/2 + E1\ E2\ J0(\mu) \cos(\delta\theta) \quad (1)$$

where $$\mu = 2\ b\ \sin(\Omega nL/2) \quad (2)$$

In equations (1) and (2), b is an amplitude of the phase modulation, n is a refractive factor of the optical fiber, L is a fiber length of the fiber coil, c is the velocity of light, $\mu$ is a modulation angular frequency, and $J0(\Omega)$ is a zero-order Bessel function.

The fundamental wave component P of the light receiving element output is given by the following equation:

$$P = 2\ E1\ E2\ J1(\mu) \sin(\delta\theta) \quad (3)$$

The double higher harmonics component Q of the light receiving element output is given by the following equation:

$$Q = 2\ E1\ E2\ J2(\mu) \cos(\delta\theta) \quad (4)$$

The quadruple higher harmonics component T of the light receiving element output is given by the following equation:

$$T = 2\ E1\ E2\ J4(\mu) \cos(\delta\theta) \quad (5)$$

For example, the phase difference $\delta\theta$ between the clockwise and counterclockwise lights can be obtained from the fundamental wave component P. In this case, the amplitudes E1 and E2 must be constant. In order for E1 and E2 to be constant, it is necessary that the quantity of light of the light emitting element is kept constant.

The optical fiber gyro of the phase modulation type has been proposed in Japanese patent application Nos. 1-57634 through 1-57637, 1-291628 through 1-291631, 1-295500, 2-3809, and 2-10055.

The above mentioned Japanese patent application No. 1-57636 discloses that fluctuation in the quantity of light of the light emitting element is controlled by keeping the direct current component D or double higher harmonics component Q constant. However, since these components include $\delta\theta$ in the form of $\cos(\delta\theta)$, E1 and E2 are kept constant only when the fiber coil is at a standstill ($\cos(\delta\theta) = 1$), by keeping D or Q constant.

The above mentioned Japanese patent application No. 1-57635 discloses that the reflected light on a fiber end face is taken into consideration and that an actual direct current light intensity is obtained by subtracting the reflected light from the direct current component of the light emitting element output.

The light emitting element is driven in such a manner that the direct current component of the light emitting element output is kept constant.

Keeping constant the magnitude of the direct current component and even times higher harmonics components, which are included in the light emitting element output, is not always equivalent to keeping the light emitting element output constant.

Until the light emitted by the light emitting element is obtained as a synchronous detection output, signals pass through a large number of parts and there are a large number of loss factors. As a loss factor, there are axis alignment between the light emitting element and the optical fiber, transmission lose of the optical fiber, radiation loss due to bending when passing through the phase modulator, photoelectric transfer efficiency of the light emitting element, amplification factor of the preamplifier, synchronous detection efficiency, etc. By multiplying the above-mentioned equations (1) and (3)–(5) by the coefficients of these factors, an actual synchronous detection output is obtained.

Even if the temperature characteristics of light emitting elements and electric circuits are satisfactory, the transfer efficiency of light will change because optical parts is expanded and contracted by a change in temperature.

A control of keeping the above-mentioned D, Q or T constant is excellent in principle because the light emitting element output viewed at the side of the light emitting element is kept constant, taking into consideration the state changes in optical parts.

In order to keep the quantity of light of the light emitting element constant, the quantity of current to be supplied to the light emitting element can be increased and decreased in such a manner that the output of an auxiliary light emitting element for monitoring light emitting element output is kept constant. A method such as this has been disclosed in Japanese patent application No. 1-60361. Between the light emitting element output W and the direct current component or even times higher harmonics components U as the light emitting element output is synchronism-detected ($\delta\theta=0$), there is only a difference in increase and decrease rates caused by factors, such as the above-mentioned axis alignment between the light emitting element and the optical fiber and the above-mentioned transmission loss of the optical fiber. The relationship between U and W can be written as:

$$U = KW \qquad (6)$$

where K is a coupling coefficient including a large number of factors. The above mentioned method of controlling the light emitting element output by monitoring the quantity of light of the light emitting element by the auxiliary light emitting element is equivalent to keeping W constant. On the other hand, the above mentioned method of keeping constant the direct current, double higher harmonics and quadruple higher harmonics components of the synchronous detection output when $\delta\theta=0$ is equivalent to keeping U constant. A method of controlling either W or U has been proposed, but there is no method of controlling both W and U at the same time.

The method of keeping constant the direct current and even times higher harmonics components of the synchronous detection output when $\delta\theta=0$ is a synthetic and comprehensive one and excellent. However, this method has its disadvantages in that, if U is kept constant when the above mentioned coupling coefficient is considerably decreased, a power for driving the light emitting element becomes large and therefore the light emitting element is subjected to excess load.

The light emitting element is required to generate a monochromatic light, so a laser diode or super luminescent diode is widely used. If the power of the light emitting element is increased, current to be supplied thereto will become large. If the current to be supplied is large, the light emitting element will be greatly deteriorated, so that the light emitting power is decreased and the light emitting element is damaged.

The reason that, as a result of a control such as this, the light emitting power excessively increased is that the coupling coefficient becomes small. This is caused mainly by the dislocation of axis center of an optical system and occurs only in a particular case of high temperature time or low temperature time.

Accordingly, it is an object of the present invention to provide a novel and improved signal processing system of an optical fiber gyro which can prevent the light emitting element from being deteriorated and damaged by excess current.

SUMMARY OF THE INVENTION

The foregoing object is accomplished in accordance with the present invention by providing a signal processing system of an optical fiber gyro including a light emitting element for generating a monochromatic light and a fiber coil formed by spirally winding a continuous optical fiber. A phase modulator is provided adjacent at one end of the fiber coil. The phase modulator comprises a piezoelectric vibrator around which a part of the optical fiber is wound, and a phase of the light passing through the optical fiber is modulated by expanding and contracting the piezoelectric vibrator. A branching element is provided for dividing the monochromatic light into clockwise and counterclockwise lights, for transmitting the clockwise and counterclockwise lights to opposite ends of the fiber coil, respectively, and for uniting again the clockwise and counterclockwise lights into a coherent light. A light receiving element is provided for detecting an intensity of the coherent light. A phase modulator drive circuit is provided for driving the phase modulator at a predetermined demodulation frequency. Furthermore, a synchronous detection circuit is provided for synchronism-detecting a sensor signal obtained from the light receiving element at the predetermined demodulation frequency and at frequencies integer times the demodulation frequency, and an auxiliary light receiving element is provided for monitoring an output of the light emitting element. When the light emitting element output is less than a predetermined value, a power for driving the light emitting element is controlled so that a direct current component or even times higher harmonics component of the sensor signal obtained from the light receiving element becomes constant. When, on the other hand, the light emitting element output has reached the predetermined value, the light emitting element output is controlled by a monitoring signal of the auxiliary light receiving element so that it does not exceed the predetermined value.

In the signal processing system of an optical fiber gyro of the present invention, the direct current component or even times higher harmonics components of the light emitting element output, and the output W of the auxiliary light emitting element for monitoring the light emitting element output are selectively used to control the drive power of the light emitting element. When the light emitting element output W is less than a predetermined value W1, a power for driving the light emitting element is controlled so that a direct current component and even times higher harmonics component of the sensor signal obtained from the light receiving element become constant. When, on the other hand, the light emitting element output W has reached the predetermined value W1, the light emitting element output W is controlled by a monitoring signal of the auxiliary light receiving element so that it does not exceed the predetermined value W1.

That is to say, when the magnitude of the synchronism-detected direct current component or even times higher harmonics components when $\delta\theta=0$ is expressed in terms of U and the light emitting element is expressed in terms of W, U is controlled so to become constant if W<W1. If the coupling coefficient K changes, W is not always constant. However, if K is decreased and W becomes equal to W1, a control of keeping K constant is stopped and W is then controlled so as to become equal to W1.

FIG. 2 is a diagram used to explain how the signal processing system of an optical fiber gyro of the present invention is controlled. The axis of abscissas represents time (t), and the axis of ordinates represents the light emitting element output W by the dashed line and represents the direct current or even times higher harmonics output U (D, Q, T, etc.) of the synchronous detection output when $\delta\theta = 0$ by the solid line. It is assumed here that $U = KW$ and that U and W are comparable values of the same degree. The coupling coefficient K is constant if environmental temperature is constant and is increased at the time of normal temperature. Therefore, as temperature changes, the coupling coefficient K changes. The coupling coefficient K tends to be decreased at a low temperature or high temperature.

When the light emitting element output W is less than a predetermined value W1, U is controlled so as to be constant. Since it is assumed that U and W are comparable quantities of the same degree, U can be controlled so as to become equal to W1. Even if U changes (t0 to t1), U will converge to W1 because of negative feedback. This is shown by the motion between the a and b points of FIG. 2. During the motion between the a and b points, the light emitting element output W may change or be constant, as shown by the dashed line. However, during t0 to t1, it not necessary to control the light emitting element output W.

For W, both possibilities are shown. At the normal temperature, the light emitting element output W is W0.

In fact, U converges to W1 for a short period of time, so t0 to t1 is a very short time. If U becomes equal to W1, as shown between the b and c points of FIG. 2, W also becomes constant. It is now assumed that temperature changes from t2 and the coupling coefficient K is decreasing. Since a control of making $U = W1$ is still acting, the light emitting element output W increases. This is a phenomenon resulting from the axis dislocation of an optical system. The light emitting element output W increases from t2 and reaches W1 at t3 (d point of FIG. 2). The synchronous detection output U is controlled to be constant until the light emitting element output W has reached W1. From the d point of FIG. 2, the light emitting element output W instead of the synchronous detection output U is controlled to be constant (W1).

Even if K continues to decrease after the d point, the light emitting element output W will not increase because a control of keeping $W = W1$ is acting. Therefore, the current that flows through the light emitting element does not exceed a predetermined value. As a result, there is no deterioration and damage of the light emitting element that is caused by excess current.

Since a control of keeping $W = W1$ is performed, the synchronous detection output U is decreased from the d point ($= W1$) to the e point. The decrease in the synchronous detection output causes a reduction in the sensibility of the optical fiber gyro. This is an unavoidable thing.

If the synchronous detection output U is kept after t3 as in the case of the prior art, the light emitting element output W will continue to increase in proportion to $K^{-1}$, as shown by the broken line d-f of FIG. 2. This shortens the life of the light emitting element considerably.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENTS

Figure 1:
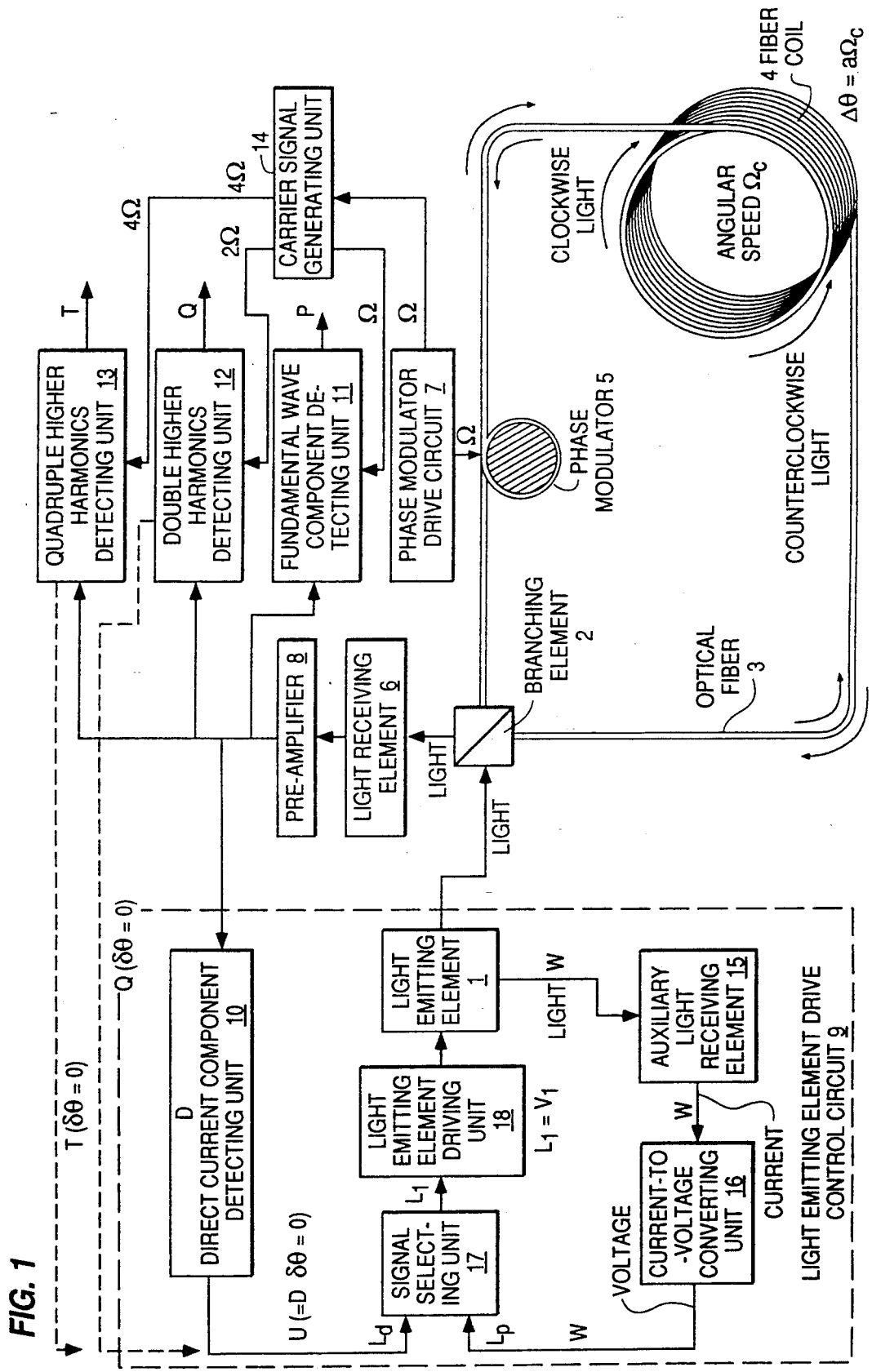
FIG. 1 is a block diagram illustrating a signal process, system of an optical fiber gyro according to the present invention.

Referring to FIG. 1, there is shown a preferred embodiment of a signal processing system of an optical fiber gyro in accordance with the present invention. In the figure, reference numeral 1 denotes a light emitting element which generates a monochromatic light of coherency and which comprises a laser diode or super luminescent diode. The monochromatic light from the light emitting element 1 is transmitted to a branching element 2 which divides the light into two and unites the two divided lights. A single mode optical fiber 3 is spirally wound around many times and made into a fiber coil 4. The lights divided by the branching element 2 are transmitted to the opposite ends of the fiber coil 4, respectively. These lights passes through the fiber coil 4 as a clockwise light and a counterclockwise light, respectively, and are united into a coherent light at the branching element 2. The coherent light from the branching element 2 is transmitted to a light receiving element 6. The optical fiber adjacent at one end of the fiber coil 4 is wound around a piezoelectric vibrator, which constitutes a phase modulator 5. Between the electrodes of the piezoelectric vibrator, modulation voltage vibrating at $\Omega$ is applied from a phase modulator drive circuit 7. The light passing through the fiber coil 4 undergoes a phase modulation of $2 b \sin(\Omega)$.

If the fiber coil 4 is rotating at a rotational angular speed of $\Omega c$, a phase difference $\delta\theta$ will occur between the clockwise and counterclockwise lights. The phase difference $\delta\theta$ is given by the following equation:

$$\delta\theta = a \, \Omega c \qquad (7)$$

where a is a known constant.

In that case, if the amplitudes of the counterclockwise and clockwise lights are E1 and E2, the wave function of the counterclockwise light will be given by the following equation:

$$E1 \sin\{wt + \delta\theta/2 + 2 b \sin\Omega(t + \tau/2)\} \qquad (8)$$

and the wave function of the clockwise light will be given by the following equation:

$$E2 \sin\{wt - \delta\theta/2 + 2 b \sin\Omega(t + \tau/2)\} \qquad (9)$$

$\tau$ is given by the following equation:

$$\tau = n \, L/c \qquad (10)$$

where n is a refractive factor of the optical fiber, L is a fiber length of the fiber coil 4, and c is the velocity of light.

The coherent light of the clockwise and counterclockwise lights is square-law detected at the light receiving element 6, and the light receiving element output is amplified with a pre-amplifier 8. For simplicity, this amplified output is referred to as a light receiving element output.

The aforesaid phase demodulator drive circuit 7 also transmits a demodulation signal to a carrier signal generating unit 14. In response to the demodulation signal, the carrier signal generating unit 14 generates a carrier signal representing an angular frequency, such as $\Omega$, $2\Omega$, and $4\Omega$, with a suitable phase.

In response to the carrier signal representing an angular frequency of $\Omega$ transmitted from the carrier signal generating unit 14, a fundamental wave component detecting unit 11 synchronism-detects the light receiving element output to obtain a fundamental wave component P. The obtained fundamental wave component P is given by the following equation:

$$P = 2\ E1\ E2\ J1(\mu)\ \sin(\delta\theta) \quad (11)$$

where $J1(\mu)$ is a Bessel function and $$\mu - 2\ b\ \sin(\Omega\tau/2) \quad (12)$$

In response to the carrier signal representing an angular frequency of $2\Omega$ transmitted from the carrier signal generating unit 14, a double higher harmonics detecting unit 12 synchronism-detects the light receiving element output to obtain a double higher harmonics component Q. The obtained double higher harmonics component Q is given by the following equation:

$$Q = 2\ E1\ E2\ J2(\mu)\ \cos(\delta\theta) \quad (13)$$

In response to the carrier signal representing an angular frequency of $4\Omega$ transmitted from the carrier signal generating unit 14, a quadruple higher harmonics detecting unit 13 synchronism-detects the light receiving element output to obtain a quadruple higher harmonics component T. The obtained quadruple higher harmonics component T is given by the following equation:

$$T = 2\ E1\ E2\ J4(\mu)\ \cos(\delta\theta) \quad (14)$$

A direct current component D of the light receiving element output is obtained by a direct current detecting unit 10. The direct current component D is expressed by the following equation:

$$D = (E1^2 + E2^2)/2 + E1\ E2\ J0(\mu)\ \cos(\delta\theta) \quad (15)$$

Any one of these values Q, T, and D when $\delta\theta = 0$ can be used as U. It is assumed here that the direct current component D is used as U. Therefore, $$U = D(\delta\theta = 0) \quad (16)$$

Of course, the double higher harmonics component Q ($\delta\theta = 0$) or quadruple higher harmonics component T ($\delta\theta = 0$) can be used as U The direct current component D in equation (16) includes, in addition to the factors shown in equation (15), axis alignment with the optical fiber, transmittance of the optical fiber, characteristics of the light emitting element, and amplification factor of the pre-amplifier. As described above, the product of these factors has been expressed by the coupling coefficient K.

Therefore, U can be thought of as the light emitting element output including the coupling coefficient K. Since U has been obtained as the signal of the detecting units 10, 12 and 13, it is a d.c. voltage signal.

In the present invention, the light emitting element output viewed at the side of the light emitting element, and an actual light emitting element output are selected as two parameters, and the driving power of the light emitting element 1 is controlled so that either one of the two outputs is kept constant. For this purpose, there is provided a light emitting element drive control circuit 9. This circuit 9 includes the above mentioned direct current component detecting unit 10 and further includes an auxiliary light emitting element 15, a current-to-voltage converting unit 16, a signal selecting unit 17 and a light emitting element driving unit 18. The auxiliary light emitting element 15 branches the light of the light emitting element 1 and measures the light emitting element output W directly. Note that the element 15 should comprise one whose sensibility is not changed by temperature. The light emitting element output W is converted into a current signal. In the current-to-voltage converting unit 16, the current signal is converted into a voltage signal Lp. Although the light emitted from the light emitting element 1 is converted to the current signal and to the voltage signal Lp, there is no change in that the voltage signal Lp is a variable representing the light emitting element output W. The voltage signal Lp is transmitted from the current-to-voltage converting unit 16 to the signal selecting unit 17. Also, the signal $U = (D: \delta\theta = 0)$ from the direct current component detecting unit 10 is transmitted as a voltage signal Ld to the signal selecting unit 17. The voltage signal Lp representing the light emitting element output W is amplified or attenuated to a value which is comparable with the voltage signal Ld.

The ratio of W and U is determined as follows. In the normal environmental temperature, W is less than U. Since U must be kept constant, Lp is controlled so as to be less than Ld.

If it is assumed that the safe upper limit of the light emitting element output W is W1, W must be controlled so that it does not exceed W1. Since, in the normal environmental temperature, U is controlled as $U = U1$ (constant value), the light emitting element output W0 at the normal environmental temperature is determined. Since W1 divided by W0 (W1/W0) can be obtained, Ld is determined by the following equation:

$$Ld = Lp(W1/W0) \quad (17)$$

Figure 2:
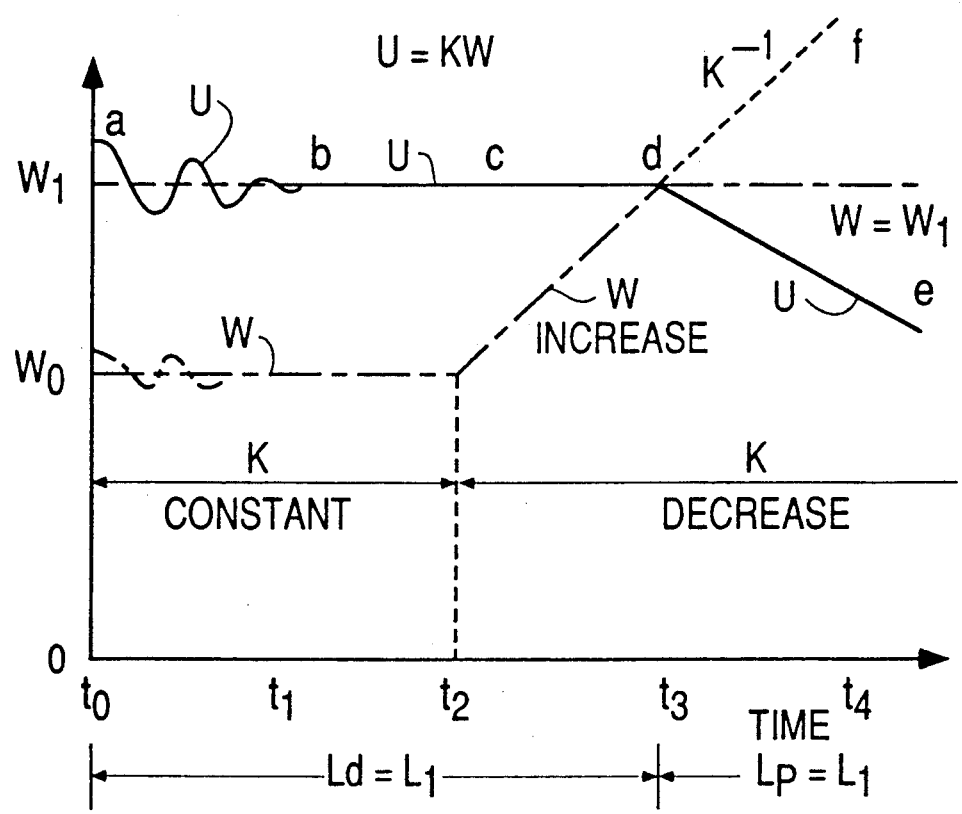
FIG. 2 is a diagram used to explain how the signal processing system is controlled.

Ld and Lp are equal to the values of U and W in the time t1 to t2 of FIG. 2, respectively.

Thus, Lp is normally less than Ld. However, if the coupling coefficient K is decreased due to a change in temperature, Lp is increased because U is controlled as $U = U1$ (that is, Ld is controlled so as to be constant). If K continues to decrease, Lp will continue to increase and, finally, becomes equal to Ld.

The above mentioned signal detecting unit 17 selects a larger one of Ld and Lp and passes the larger value therethrough as L1.

$$L1 = \max\{Ld, Lp\} \quad (18)$$

In the light emitting element driving unit 18, L1 is controlled so as to become a predetermined voltage value V1. L1 is Ld or Lp, and if $Ld > Lp$, Ld is selected. In that case, U is controlled so as to become a constant value U1. $Ld > Lp$ is equivalent to $W < W1$ and means that the light emitting element output is less than W1.

If, on the other hand, $Ld < Lp$, L1 is Lp and therefore W is controlled so as to become a predetermined value W1. Ld<Lp is equivalent to W=W1 and means that the light emitting element output is equal to its upper limit W1.

The above description has been explained in FIG. 2. The predetermined voltage V1 set by the light emitting element driving unit 18 is a value which is obtained as Lp=V1 when W =W1 and as Ld=V1 when U=U1. As described in FIG. 2, the above control can be performed if Ld and Lp are comparable values of the same degree.

If the environmental temperature is too high or too low, W is controlled so as to be equal to W1, so that the drive power of the light emitting element does not exceed W1. Therefore, the life of the light emitting element can be extended. If the environmental temperature changes again to an intermediate temperature region, Ld will become greater than Lp because $K^{-1}$ is decreased. Then, U is controlled again so as to become constant.

Although the invention has been described with a certain degree of particularity, it is understood that the present disclosure has been made only by way of example and that numerous changes in the details of the construction and the combination and arrangement of parts may be made without departing from the scope of the invention as hereinafter claimed.

What I claim is:

1. A signal processing system of an optical fiber gyro comprising:

a light emitting element for generating a monochromatic light;

a fiber coil formed by spirally winding a continuous optical fiber;

a phase modulator provided adjacent at one end of said fiber coil and comprising piezoelectric vibrator around which a part of said optical fiber is wound, a phase of the light passing through said optical fiber being modulated by expanding and contracting said piezoelectric vibrator;

a branching element for dividing said monochromatic light into clockwise and counterclockwise lights, for transmitting said clockwise and counterclockwise lights to opposite ends of said fiber coil, respectively, and for uniting again said clockwise and counterclockwise lights into a coherent light;

a light receiving element for detecting an intensity of said coherent light;

a phase modulator drive circuit for driving said phase modulator at a predetermined demodulation frequency;

a synchronous detection circuit for synchronism-detecting a sensor signal obtained from said light receiving element at said predetermined demodulation frequency and at frequencies integer times said demodulation frequency; and an auxiliary light receiving element for monitoring an output of said light emitting element; and when the light emitting element output is less than a predetermined value, a power for driving said light emitting element being controlled so that a direct current component or a harmonic component at an even number times the fundamental component of said sensor signal obtained from said light receiving element becomes constant; and when said light emitting element output has reached said predetermined value, said light emitting element output being controlled by a monitoring signal of said auxiliary light receiving element so that it does not exceed said predetermined value.

2. A signal processing system as set forth in claim 1, wherein said direct current component or a harmonic component at an even number times the fundamental component and said light emitting element output are values comparable with each other.

* * * * *